Figure 1:
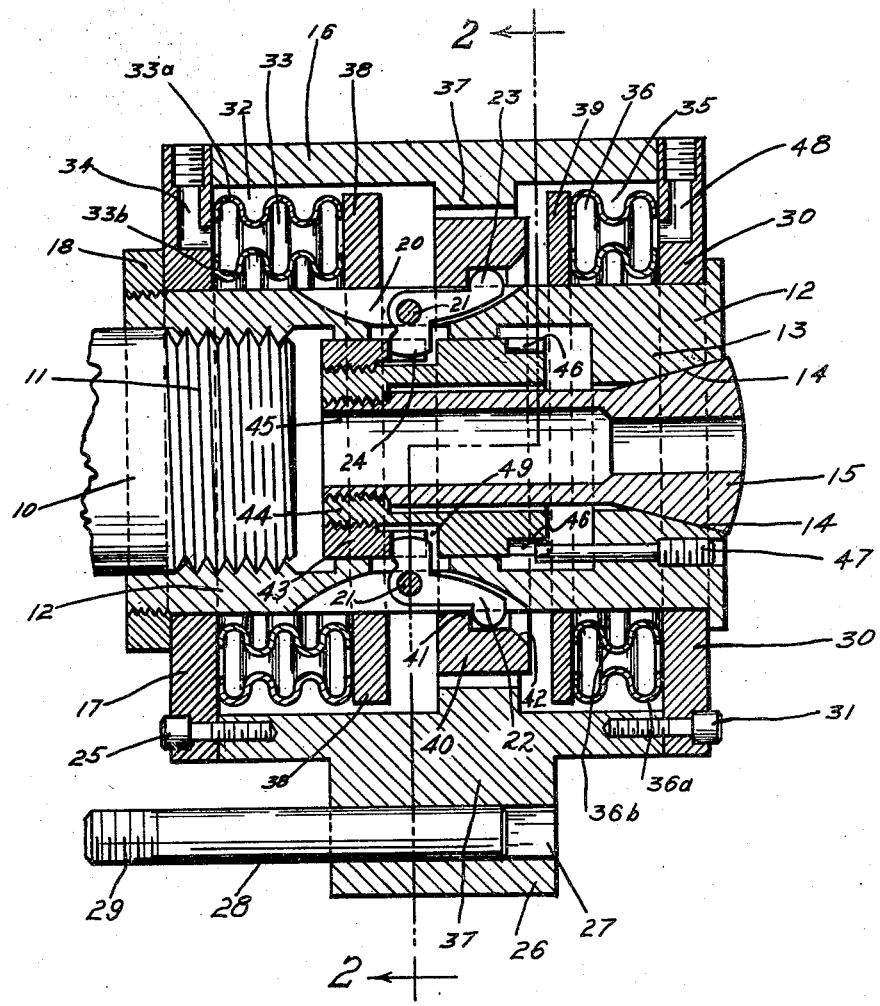

July 24, 1951 E. G. SMITKA 2,562,134
PRESSURE ACTUATED COLLET-TYPE CHUCK
Filed July 28, 1949 2 Sheets-Sheet 1

Edward G. Smitka
INVENTOR.

BY John F. Brezina
ATTORNEY

EDWARD G. SMITKA
INVENTOR.
BY John F Brezina
ATTORNEY.

Patented July 24, 1951

2,562,134

UNITED STATES PATENT OFFICE 2,562,134

PRESSURE ACTUATED COLLET-TYPE CHUCK

Edward G. Smitka, Chicago, Ill.

Application July 28, 1949, Serial No. 107,345

9 Claims. (Cl. 279—4)

My invention relates to a new and novel collet-type chuck which employs a fluid pressure as a means for actuating parts thereof to cause a gripping or closing of the jaws of the collet.

Prior devices which have been operated on this principle have employed a piston movable within a chamber in order to produce the desired results. However, these prior means for transmitting a fluid pressure have not been entirely satisfactory because of inherent inadequacies in the means employed which were responsible for a leakage of the pressure transmitting fluid. It is therefore an object of my invention, as will be more particularly illustrated and described herein, to provide in a collet-type chuck a means which will preclude the leakage of pressure transmitting fluid. It is an object of my invention to provide a means for transmitting fluid pressure including a completely enclosed chamber, an integral wall of which is movable.

Investigation of the references in this general art has led me to believe that prior devices of the same class as mine have been required, in order to operate, to maintain the fluid pressure during the entire period when the gripping action of the collet was required. This necessity has a distinct disadvantage in that leakage or stoppage of the fluid pressure through the conduit from a source would produce an impairment of the operation of the device because the gripping of the collet could only be effected when the pressure was being appropriately applied. It is an object of my invention to provide a combination of elements which, once having been forced into appropriate positions by the fluid pressure, cause a locking of the elements involved to maintain the collet in gripping position and which will cause the collet to be maintained in gripping position after the pressure has been removed. It will be understood that by thus providing a means which precludes the necessity of a continuous fluid pressure great efficiency and saving is achieved. It is additionally an object of my invention to provide a means for adjusting the collet with relation to the locking mechanism so that as the parts of my device wear compensation may be made for such wear so that maximum efficiency will be constantly reached.

It is additionally an object of my invention to provide a system of levers through which the fluid pressure may be transmitted so that the mechanical advantage of the collet is multiplied to enable the collet to grip with a force which is greater than that of the fluid pressure.

Inasmuch as I am providing a pressure actuated collet-type chuck device which will operate after the actuating pressure has been removed, it is also necessary that I provide a suitable means for causing a release or unlocking of the jaws of the collet. Therefore it is a further object of my invention to provide a pressure actuated releasing mechanism including an expansible chamber, an integral wall of which is movable, for causing an unlocking of the jaws of the collet. Additionally, it is an object of my invention to provide a collet slidable within a beveled or tapered seat or flange which is adapted to have the jaws thereof moved to gripping or non-gripping positions and having a suitable actuating mechanism for accomplishment of the said movement of the jaws and having expansible fluid operated bellows for actuating said last mentioned mechanism to produce the desired result.

Other and further objects of my invention will become apparent from the following description and appended claims reference being had to the accompanying drawings and numerals of reference thereon.

On the drawings:

Fig. 1 designates a cross-sectional view taken on a vertical plane and passing through substantially the center of my device.

Figure 2:
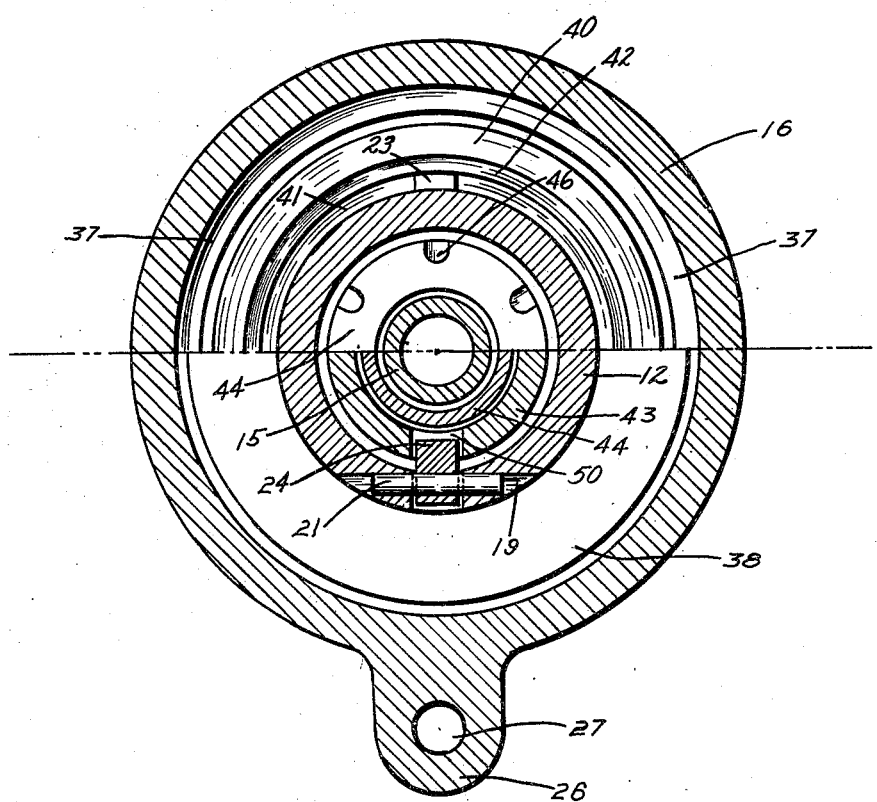

Fig. 2 designates a sectional view of my device taken substantially on the line 2—2 and looking in the direction of the arrows.

Referring to the drawings, Fig. 1, it will be seen that numeral 10 designates any standard or conventional lathe spindle which is preferably externally threaded as indicated at 11. It will be noted that I provide an internally threaded elongated sleeve 12 which is securely threaded against rotation on lathe spindle 10 so that as the lathe spindle 10 rotates sleeve 12 will also rotate. Sleeve 12 is preferably provided with an inwardly extending annular flange 13 and it will be noted by referring to Fig. 1 that the inner wall of said flange is tapered or beveled as indicated at 14 to provide a seat for the slidably gripping jaws of collet 15 which will hereinafter be described. It should be understood that the flange 13 does not necessarily have to be formed integral with sleeve 12 and that under certain conditions of manufacture and of use it is preferable that the flange 13 be provided by a separate non-integral member. However, whether or not flange 13 is formed integral with sleeve 12 is a matter of choice and it should be understood that in any event the inventions herein embraced would not be affected.

It will be noted by referring to the drawings that numeral 16 designates the outer shell or housing of my novel chuck. The outer shell 16 may be made of any appropriate or suitable material. Numeral 17 designates an apertured rear plate which is retained in appropriate relation to the housing 16 by any suitable means and it will be noted that to facilitate retention of said rear plate or base 17, I provide a suitable lock nut designated as numeral 18 which in the form illustrated here is threaded on an end extension of sleeve 12, and that I use suitable screws 25 which are threaded into housing 16 as illustrated in Fig. 1.

As illustrated in Figs. 1 and 2, it will be noted that the sleeve 12 is provided with a plurality of holes or their equivalents 19, one of which is clearly illustrated in Fig. 2, and a plurality of inwardly opening apertures 20 which are communicatively connected to respective holes 19. In each of the holes 19, a pin or pintle 21 is pivotally mounted and a lever arm 22 is secured to each of the pins 21. Each of the levers 22 is provided with an end ear or lug 23 and an end ear or lug 24 which will be hereinafter more fully described.

Numeral 26 designates a normally downwardly extending apertured lobe or lug which is provided with an aperture 27. By referring to Fig. 1, it will be seen that an anchor stud 28 is adapted to be slidably mounted in the aperture or opening 27. In one form of my device I employ the anchor stud 28 to maintain the housing from rotation and displacement and this is accomplished by threading the threaded end 29 of stud 28 into the head stock housing of the lathe (not shown). Numeral 30 represents a front plate or member which is mounted in its appropriate position, as illustrated in Fig. 1 of my device, and it will be seen that in the form illustrated herein I employ screws 31, one of which is illustrated, to retain the front plate securely against the housing or shell 16. Referring to Fig. 1, it will be seen that I provide an annular partially enclosed chamber 32. An expansible corrugated member or annular bellows 33, preferably comprising an outer corrugated tube 33a and an inner corrugated tube 33b, is positioned within the chamber 32 and it will be noted that the rearmost portion of the bellows 33 is preferably rigidly connected to rear plate 17 by any suitable means. It should be observed that a conduit 34 communicatively connects the chamber of bellows 33 with an appropriate fluid supply source. It should also be observed that the bellows 33 is positioned around and outwardly of the sleeve 12.

Numeral 35 designates a forward or front partially enclosed chamber and positioned within said chamber 35 is a bellows or expansible corrugated member 36 which preferably comprises an outer corrugated tube 36a and an inner corrugated tube 36b. Tubes 36a and 36b are rigidly secured to the front plate. It will be observed that in the preferred form illustrated herein the outer housing 16 is provided with an inwardly extending annular flange 37 which partially divides the interior of the chuck into partially enclosed chambers 32 and 35.

Ring or annular plate 38 is slidably mounted on sleeve 12 and it will be seen that the ring 38 is hermetically connected to the forward end of the rear bellows 33. In a preferred form I also provide a ring or plate 39 which is connected to the rearmost portions of the forward corrugated tubes 36a and 36b. It should be understood that the chambers of the bellows 33 and 36 are completely hermetically sealed so there can be no leakage of fluid pressure and it is also to be understood that in the event the inner and outer corrugated tubes of bellows 33 and 36 are not joined together they may be sealed or connected to respective plates 38 and 39. However, I desire it to be fully understood that in the latter event the rings 38 and 39 do not function as pistons but as a force transmission means which hermetically seals the chambers of the respective expansible bellows.

Numeral 40 designates an annular lock lever which is slidably mounted on the sleeve 12. The lever 40 has an inwardly extending flange 41 and said lever 40 is provided with an annular bevel or taper cam face illustrated as 42. The operation of lock ring 40 will be described at greater length hereinafter.

As illustrated in the drawings, numeral 43 represents an annular internally threaded thrust sleeve which is slidably mounted within the body sleeve 12, which is provided with a plurality of recesses 50 into which lobes 24 normally extend as illustrated in Fig. 2, and it is to be understood that during the normal operation of my novel device the thrust sleeve 43 is retained from rotation independent of body sleeve 12 due to the coaction of lever lobe 24 with the walls of recesses 50 in thrust sleeve 43.

Numeral 44 designates an adjusting sleeve which is adjustably threaded into thrust sleeve 43 and which is also preferably internally threaded. Numeral 15, as previously indicated, represents a collet having a plurality of jaws which are adapted to be shut tight upon a piece of work and to be retained thereby. It will be seen that the end stem or shaft of collet 15 is provided with threads 45 and that said collet is thereby adapted to be threaded into the adjusting sleeve 44.

Numeral 46 designates a plurality of apertures, holes or openings which are preferably annularly spaced in adjusting sleeve 44. Numeral 47, illustrated in Fig. 1, represents a pin which extends into one of the apertures 46 to retain adjusting sleeve 44 from independent rotation. It should be noted that the lobes 24 of levers 22 partially extend into the space 49 provided between thrust sleeve 43 and adjusting sleeve 44.

In order to more readily appreciate some of the major concepts of my invention I shall briefly describe the manner in which the form of my invention herein described operates:

It is to be understood that when fluid pressure is transmitted through the conduit 34 through suitable conduits (not shown) from a fluid pressure source (not shown) that the bellows 33 will expand longitudinally. The expansion of bellows 33 causes plate 38 to move forward. The obvious advantage of providing inwardly extending flange 37 is now apparent and it will be noted that flange 37 is adapted to stop the normal movement of the plate 38 so that the bellows 33 will not be stretched beyond the desired limit. As the plate 38 moves forward it is forced into engagement with lock ring 40 to move same to the position which is illustrated in Fig. 1. The normally frictional engagement of the lobe 23 of lever or arm 22 with lock ring 40 is sufficient to retain said lock ring from slipping back during the normal operation of my device and therefore it is possible after the lever 22 has been pivoted, because of engagement with lock ring 40, to cut off or stop the pressure required to force lock ring 40 forward. This enables my device to operate without the impediment of the fluid pressure force and therefore precludes undue wear which would arise from operation of my device under pressure. The engagement of lock ring 40 with lobe 23 causes the lever 22 to pivot to thereby cause the ears 24 of levers 22 to similarly be moved rearwardly. Inasmuch as the ears 24 are in engagement with the thrust sleeve 43, the rearward movement of said ears causes the thrust sleeve 43 to be forced rearwardly thereby drawing adjusting sleeve 44 and the collet 15 rearwardly. The rearward movement of collet 15 is adapted to cause the jaws of said collet to close and impinge upon any work which is positioned in the bore of said collet.

In order to release the work from the jaws of the collet 15 pressure is transmitted into the bellows 36 through the conduit 48 from an appropriate source. This pressure causes the bellows 36 to expand longitudinally to thereby cause the movement of plate 39 rearwardly against the forward edge of lock ring 40. The annular flange 37 is adapted to stop the rearward movement of the plate 39. However, when the plate 39 has been stopped from any further rearward movement it has caused a disengagement of the lobes 23 from the lock ring 40. The rearward movement of ring 40 during the unlocking process is sufficient to permit a pivoting of the levers 22 so that the lobes 24 of levers 22 release the locking pressure against thrust sleeve 43 to thereby permit the normal spring pressures of the collet jaws and body to move the collet outwardly to a normal open position.

Prior inventions in this art have been devoid of any adjusting mechanism to compensate for wear of the component elements. My novel invention, however, provides an adjusting mechanism for the compensation of wear in the mechanism involved in locking and releasing the collet. When it is desired to adjust the collet the pin 47, which is adapted to retain the adjusting sleeve from independent rotation, is removed and the collet 15 which is securely threaded into the adjusting sleeve to retain said collet from any further rotation independent of adjusting sleeve 44, is rotated together with adjusting sleeve 44 to cause the same to thread rearwardly in the thrust sleeve 43. It will be seen that this adjustment causes the space designated as 49 between thrust sleeve 43 and adjusting sleeve 44 to become smaller so that a lesser movement of the levers 22 will be required to move the collet 15.

It is to be observed that I am able to achieve great mechanical advantage in my device as a result of the ratio of the distance between the ears 24 and the pin 21 and the ears 23 and the pin 21.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In a collet-type chuck having a housing, a means within said housing providing a seat, a collet engaging in said seat, and having movable means for changing the relative positions of said seat with respect to said collet, characterized by an expansible means within said housing and having a chamber communicatively connectable to a fluid pressure source and being adapted to actuate said movable means, said expansible means being expansible and having an integral wall thereof movable to affect a movement of said movable means to thereby cause the jaws of the collet to close or open.

2. In a collet-type chuck or the like having a housing, and means within said housing providing a tapered seat, a collet engaging in said seat, and having movable means for changing the relative positions of said seat with respect to said collet, a bellows within said housing and having a chamber communicatively connectable to a fluid pressure source and being adapted to actuate said movable means, said bellows being expansible and having an integral wall thereof movable to affect a movement of said movable means to thereby cause the jaws of the collet to close; and a second bellows within said housing and having a chamber communicatively connectable to a fluid pressure source and being adapted to actuate said movable means, said bellows being expansible and having an integral wall thereof movable to affect a movement of said movable means to thereby cause the jaws of the collet to open.

3. In a collet-type chuck or the like having a housing, and sleeve within said housing providing a tapered seat, a collet engaging in said seat, and having movable means for changing the relative positions of said seat with respect to said collet, said last means comprising lever means pivoted in said sleeve; an adjusting sleeve secured to the inner end of said collet; a thrust sleeve adjustably carried by said adjusting sleeve, the pivoting of said lever in one direction being adapted to force said thrust sleeve rearwardly to thereby cause said collet to slide inwardly to thereby close the jaws of said collet, the movement of said lever in an opposite direction being adapted to force said adjusting sleeve forwardly to urge said collet outwardly to thereby open the jaws of said collet.

4. In a collet-type chuck substantially as described in claim 3 and having an expansible bellows retained in said housing and being communicatively connected to a fluid pressure source; a movable lock ring frictionally engageable with said lever means, the increase in pressure in said bellows being adapted to cause same to expand to thereby cause said ring to frictionally engage, pivot and hold said lever means in pivoted positions, and having means for disengaging said lock ring from said lever, the disengagement of said ring and said lever being adapted to pivot said lever to thereby permit the jaws of said collet to open.

5. In a collet-type chuck substantially as recited in claim 3 and having a ring slidable on said sleeve and frictionally engageable with said lever and adapted to pivot same; means for causing said ring to frictionally engage and disengage said lever and having an adjusting means comprising a plurality of annularly spaced slots; and having a pin removably mountable in said slots and being adapted to retain said adjusting sleeve from rotation independent of said thrust sleeve, the removal of said pin being adapted to permit adjustment of said collet with respect to said thrust sleeve and said lever means.

6. In a collet-type chuck, a collet; a sleeve providing a seat in which said collet is slidable; movable means for changing the relative position of said seat with respect to said collet, and an expansible hermetically sealed annular housing communicatively connected to a fluid pressure source for actuating said movable means, said housing having an integral wall thereof movable to affect a movement of said movable means to thereby cause the jaws of the collet to close or open; a lever actuable by the expansion of said housing and pivoted in said sleeve; and means engageable with said lever whereby said collet may be locked in position.

7. In combination, a housing providing a chamber, a bellows in said chamber and being communicatively connected to a fluid pressure source; a lever actuable by the expansion of said bellows; a slidable sleeve engaging said lever and adapted to be moved thereby; a collet operatively connected to said sleeve; means providing a seat for said collet, the movement of said sleeve being adapted to cause said collet to move against the walls of said seat to thereby cause a closing of the jaws of said collet and means engageable with said lever for locking it in collet closed position.

8. In a collet-type chuck having a housing, means within said housing providing a seat, and having a movable means within said housing for changing the relative positions of said seat and collet and being characterized by an expansible means, an integral wall of which is movable, said expansible means being communicatively connectable to a fluid pressure source whereby said movable means may be moved to thereby cause the jaws of the chuck to open or close.

9. In a collet-type chuck substantially as defined in claim 8 being further characterized by a locking means for locking said movable means whereby the retraction of said expansible means will not affect the movable means.

EDWARD G. SMITKA.

REFERENCES CITED

The following references are of record in the file of this patent:

UNITED STATES PATENTS

| Number | Name | Date |
|---|---|---|
| 2,163,033 | Gosling et al. | June 20, 1939 |
| 2,376,475 | Bush | May 22, 1945 |
| 2,383,094 | Walder | Aug. 21, 1945 |
| 2,387,486 | Zellas | Oct. 23, 1945 |
| 2,392,999 | Redmer | Jan. 15, 1946 |
| 2,393,458 | Cook | Jan. 22, 1946 |
| 2,418,082 | Marasko | Mar. 25, 1947 |